United States Patent [19]

Okuda et al.

[11] Patent Number: 5,575,957

[45] Date of Patent: Nov. 19, 1996

[54] ACICULAR ELECTROCONDUCTIVE TIN OXIDE FINE PARTICLES AND PROCESS FOR PRODUCING SAME

[75] Inventors: Haruo Okuda; Hideo Futamata; Hideo Takahashi; Norihiko Sanefuji, all of Yokkaichi, Japan

[73] Assignee: Ishihara Sangyo Kaisha, Ltd., Osaka, Japan

[21] Appl. No.: 576,909

[22] Filed: Dec. 22, 1995

[30] Foreign Application Priority Data

| Dec. 27, 1994 | [JP] | Japan | 6-340046 |
| Jan. 27, 1995 | [JP] | Japan | 7-031506 |
| Feb. 20, 1995 | [JP] | Japan | 7-056495 |
| Jun. 23, 1995 | [JP] | Japan | 7-180937 |

[51] Int. Cl.$^6$ .............................. H01B 1/00; H01B 1/08
[52] U.S. Cl. ...................... 252/521; 252/518; 423/92; 423/202; 428/363; 428/403; 106/415; 106/482
[58] Field of Search .................. 252/518, 521; 423/92, 202; 428/363, 403; 106/415, 482, 903

[56] References Cited

U.S. PATENT DOCUMENTS

| 5,236,737 | 8/1993 | Linton | 427/126.3 |
| 5,364,566 | 11/1994 | Jacobson | 252/518 |

FOREIGN PATENT DOCUMENTS

| 2681850 | 4/1993 | France . |
| 2710628 | 4/1995 | France . |
| 56-041603 | 4/1981 | Japan . |
| 56-120519 | 9/1981 | Japan . |
| 61-017421 | 1/1986 | Japan . |
| 61-026933 | 6/1986 | Japan . |
| 62-158199 | 7/1987 | Japan . |
| 4-077317 | 3/1992 | Japan . |
| 5-117906 | 5/1993 | Japan . |
| 9306040 | 4/1993 | WIPO . |
| WO-A-94 00852 | 1/1994 | WIPO . |

OTHER PUBLICATIONS

JP-A-03 062433, Patent Abstracts of Japan, vol. 15, No. 219, Jun. 5, 1991.
JP-A-04 062713, Derwent Publications, Ltd., London, GB, Class A14, AN 92-126294, Feb. 27, 1994.
JP-A-61 286224, Derwent Publications, Ltd., London, GB, Class A60, AN 87-027496, Dec. 16, 1986.

*Primary Examiner*—Paul Lieberman
*Assistant Examiner*—M. Kopec
*Attorney, Agent, or Firm*—Cushman, Darby & Cushman

[57] ABSTRACT

The invention provides acicular electroconductive tin oxide fine particles which has a mean diameter of 0.005–1 μm and a mean length of 0.05–10 μm and an aspect ratio of 3 or higher. The invention further provides a process for producing the acicular electroconductive tin oxide fine particles, which comprises firing a starting material containing tin, silicon and an alkali metal halide at 700°–1200° C. and removing soluble salts from the resulting fired product.

9 Claims, 2 Drawing Sheets

×100,000

×100,000

×100,000

×100,000

×100,000

ACICULAR ELECTROCONDUCTIVE TIN OXIDE FINE PARTICLES AND PROCESS FOR PRODUCING SAME

BACKGROUND OF THE INVENTION

1. Field of the Invention

The present invention relates to acicular electroconductive fine particles of tin oxide, a process for producing the same, and a method for using the same, more particularly to an acicular electro conductive fine particles of tin oxide capable of providing excellent, highly functional articles with an increased range of applications and increased values added.

2. Description of Related Art

Various materials have been proposed as an electroconductivity-imparting agent or antistatic agent for plastics, rubbers, fibers, etc., or as an electroconductivity-imparting agent for a support of recording materials such as electrophotographic copying papers, static recording papers, etc. For example, there are known acicular or fibrous electroconductive tin oxide particles (e.g., see JP-A-56-120519, JP-A-62-158199 and JP-A-5-117906), antimony-containing tin oxide spherical particles (e.g., see JP-A-4-77317), electroconductive stannic oxide fibers (e.g., see JP-A-61-17421), electroconductive particles comprising titanium dioxide powder the surface of which is coated with an electroconductive layer comprising tin oxide or tin oxide and antimony oxide (e.g., see JP-A-56-41603), fibrous potassium titanate the surface of which is coated with stannic oxide (e.g., see JP-B-61-26933), etc.

Since the above-mentioned tin oxide particles, titanium dioxide particles or potassium titanate electroconductive particles have a so-called electronic conduction type electroconductive function, they have a higher stability of electroconductivity against humidity and temperature as compared with ionic conduction type materials such as polyelectrolytes and they have recently been noticed to be utilized as a functional materials such as an electroconductivity imparting agents for rendering materials and articles antistatic in various fields, such as paints, inks, plastics and fibers, and, furthermore, as reinforcing fillers. Their application has been rapidly attempted.

The electroconductivity-imparting agent is incorporated in rubbers, plastics, papers, etc. or dispersed in a solution containing a binder to prepare a coating solution, followed by coating this solution on various films, sheets, supports, vessels, etc. In order to obtain superior electroconductivity, the content of the particles must be increased so that at least adjacent particles intimately contact with each other. Therefore, it is difficult to produce electroconductive materials or electroconductive layers requiring transparency by using such particles.

Furthermore, if an acicular or fibrous electroconductivity-imparting agent is used, electroconductive paths can effectively be formed even with a small amount of the electroconductivity-imparting agent per unit area or volume. However, when, for example, carbon fibers, metal wools, metal whiskers, etc. are used, since these are all colored, they are not suitable for the use requiring transparency or requiring whiteness such as paper.

In order to solve these problems, for example, a white electroconductive materials has been proposed which comprises a fibrous potassium titanate coated with a conductive layer of tin oxide. This has no problem in the shape of particles, but is high in powder resistance and is unsatisfactory in strength. Even when the conductive layer comprises tin oxide and antimony oxide, there is a problem that a desired materials having a low powder resistance hardly produced owing to the influence of potassium contained therein.

Furthermore, it is known that conventional electroconductive stannic oxide fibers are produced by a process of very slowly heating and firing tin oxalate (JP-A-56-120519), the process of evaporating tin oxide using copper as a solvent and introducing the vapor into a low-temperature zone to precipitate the tin oxide (JP-A-62-158199), a process of spinning a spinning solution prepared using a tin compound (JP-A-5-117906), etc. However, the products obtained by these processes are thick and long, for example, 0.5 μm in diameter and about 3 mm in length, and, furthermore, cannot be used in the fields requiring transparency. In addition, the processes comprise melting the starting material in an electric furnace and precipitating a fibrous product from the melt and they need a long time and are unsuitable for industrial production.

In the above-mentioned uses or applications of electroconductive powders, recently, they are required to have an ability to impart the desired electroconductivity, for example, in antistatic treatment for avoiding static charging of OHP films, CRT windows, IC packages and containers of electronic equipments and for use in a liquid crystal display and transparent electrodes such as EL body and, simultaneously, required to cause substantially no absorption of light by the surface of materials to be treated and to be able to form an ultra-thin electroconductive film.

SUMMARY OF THE INVENTION

The object of the present invention which solves the problems above is to provide an acicular electroconductive tin oxide fine particles which have a conductivity suitable for imparting the above-mentioned desired characteristics to materials in the fields of various uses and which is superior in transparency, a process for producing the fine particles, and a method for using the fine particles.

The object above has been attained by a process for producing an acicular electroconductive tin oxide fine particles having a mean diameter of 0.005–1 μm and a mean length of 0.05–10 μm and an aspect ratio of 3 or higher which process comprises firing a starting material containing tin, silicon and an alkali metal halide at 700°–1200° C. and removing soluble salts from the resulting fired product; a process for producing the above-mentioned acicular electroconductive tin oxide fine particles additionally containing antimony, which process comprises adding a solution of an antimony compound to a suspension of the above-mentioned acicular electroconductive tin oxide fine particles, then carrying out neutralization to deposit hydrous antimony oxide on the surface of the tin oxide fine particles, and, thereafter, firing the filtrated and recovered product at 700°–1000° C.; acicular electroconductive tin oxide fine particles having a mean diameter of 0.005–1 μm and a mean length of 0.05–10 μm and an aspect ratio of 3 or higher; the above-mentioned acicular electroconductive tin oxide fine particles which additionally contain antimony; an aqueous dispersion obtained by dispersing the above-mentioned acicular electroconductive tin oxide fine particles in an aqueous medium; an aqueous dispersion obtained by dispersing the acicular electroconductive tin oxide fine particles containing antimony in an aqueous medium; and an electroconductive composition which comprises 100 parts by weight of a resin based on solid matter and 3–200 parts by weight of the above-mentioned acicular electroconductive tin oxide fine particles or the above-mentioned acicular electroconductive tin oxide fine powder containing antimony.

DETAILED DESCRIPTION OF THE PREFERRED EMBODIMENTS

Figure 1:
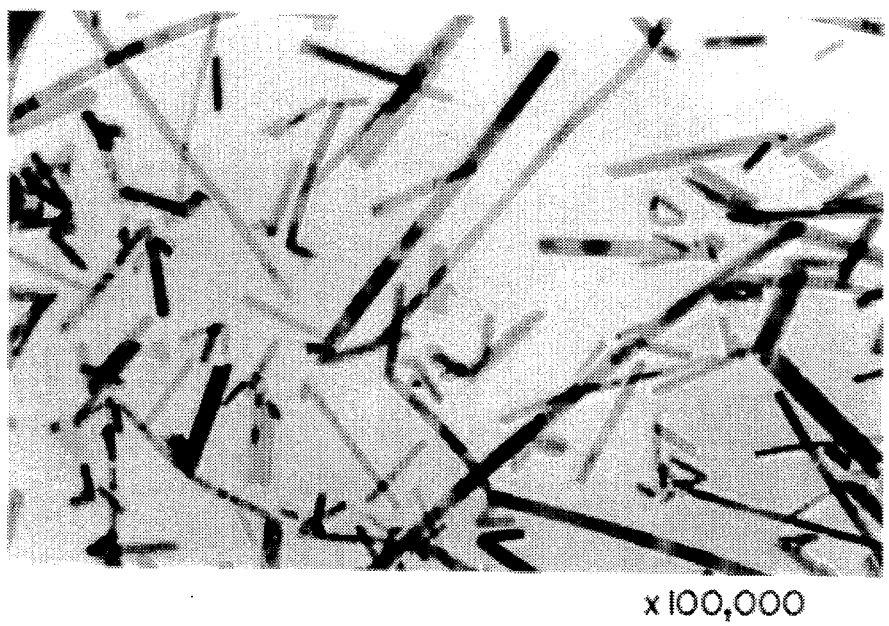
FIG. 1 is an electron photomicrograph (×100,000) which shows the particle shape of the acicular electroconductive tin oxide fine particles of the present invention obtained in Example 4.

In an attempt to provide an electroconductivity-imparting agent which solves the above-mentioned problems and satisfy the above performances, the inventors have conducted researches on efficient impartation of electroconductivity by adding tin oxide fine particles in a small amount by making the tin oxide fine particles acicular for easily continuously contacting the particles with each other in a medium used. As a result, it has been found that (1) when tin oxide fine particles have an acicular shape with a specific mean length, a specific mean diameter and an aspect ratio of greater than a specific value, the tin oxide fine particles can be an optimum high-functional material which can impart markedly excellent conductivity, transparency and surface smoothness, (2) when tin oxide fine particles are prepared by firing a tin component in the presence of an alkali metal halide, unexpectedly the tin oxide can become acicular only when a silicon component is present, and the acicular tin oxide fine particles of an optimum length of the above (1) can be industrially very advantageously produced, and, in addition, the product which is subjected to a treatment for removal of soluble salts is excellent in performances such as electroconductivity, transparency, surface smoothness and adhesion in various uses, and, furthermore, when the silicon component is allowed to remain in a given amount, the resulting fine particles are excellent in dispersibility in water, and an aqueous dispersion suitable for various uses can easily be produced, (3) when an antimony component is additionally present in the firing step for preparing the acicular tin oxide fine particles of the above (2), there can be obtained acicular electroconductive tin oxide fine particles containing antimony which have a superior electroconductivity to that of the acicular electroconductive tin oxide fine particles containing no antimony, and (4) acicular electroconductive tin oxide fine particles containing antimony which have substantially no bluish color and a high lightness, excellent electroconductivity and transparency, and good acicularity can be obtained by producing hydrous antimony oxide on the surface of the acicular electroconductive tin oxide fine particles produced in the above (2), filtrating and recovering the particles and firing them. Thus, the present invention has been accomplished.

That is, the present invention relates to acicular electroconductive tin oxide fine particles having a mean diameter of 0.005–1 µm and a mean length of 0.05–10 µm and an aspect ratio of 3 or higher, preferably acicular electroconductive tin oxide fine particles having a mean diameter of 0.005–0.05 µm and a mean length of 0.1–3 µm and an aspect ratio of 5 or higher. The present invention further relates to the above acicular electroconductive tin oxide fine particles containing antimony. The present invention further relates to a process for producing the tin oxide fine particles and a method for using the fine particles. The "mean particle size" (the mean diameter and length) used in the present invention is a 50 wt % mean particle size obtained by observing an electron photomicrograph (×100,000). Furthermore, the "acicular particles" used in the present invention includes fibrous particles, columnar particles, rod-like particles and particles of similar shapes within the above-mentioned ranges of the sizes in addition to the acicular particles.

The acicular electroconductive tin oxide fine particles of the present invention can be obtained by firing a starting material containing tin, silicon and an alkali metal halide at 700°–1200° C. and, then, removing soluble salts in the resulting fired product. Alternatively, the acicular electroconductive tin oxide fine particles containing antimony can be obtained by firing a starting material containing tin, antimony, silicon and an alkali metal halide and, then, removing soluble salts in the resulting fired product or by depositing hydrous antimony oxide on the surface of the acicular tin oxide particles as substrate and then firing them.

The starting materials in the present invention contain tin, silicon and an alkali metal halide or contain tin, antimony, silicon and an alkali metal halide. Among them, those which do not contain one or more components other than tin are called precursors.

The starting materials may be those which are obtained by adding a silicon compound and an alkali metal halide to a precursor comprising hydrous tin oxide or a dehydrated product thereof; those which are obtained by adding an alkali metal halide to a precursor comprising hydrous tin oxide or a dehydrated product thereof containing silicon; those which are obtained by depositing hydrous silicon oxide on the surface of a precursor comprising hydrous tin oxide or a dehydrated product thereof and then adding an alkali metal halide thereto; those which are obtained by adding an alkali metal halide to a precursor comprising hydrous tin oxide or a dehydrated product thereof containing antimony and silicon; those which are obtained by adding at least one of an antimony compound and a silicon compound and an alkali metal halide to a precursor comprising hydrous tin oxide or a dehydrated product thereof containing at least one of antimony and silicon; or those which are obtained by depositing hydrous silicon oxide on the surface of a precursor comprising hydrous tin oxide or a dehydrated product thereof containing antimony and then adding an alkali metal halide thereto.

The precursor comprising a tin compound and a silicon compound or a tin compound, an antimony compound and a silicon compound can be prepared by various processes using particles of the respective compounds or solutions of the respective compounds. For example, mention may be made of the following processes: (a) an aqueous solution of a tin compound and an aqueous solution of a silicon compound, and an aqueous alkali solution are added in parallel to a hot water of 70°–90° C. to carry out neutralization or an aqueous solution of a tin compound and an aqueous solution of an antimony compound, and an aqueous solution of a silicon compound and an aqueous alkali solution are added in parallel to a hot water of 70°–90° C. to carry out neutralization, (b) an aqueous alkali solution is added to an aqueous solution of a tin compound or a mixed aqueous solution of an aqueous solution of a tin compound and an aqueous solution of an antimony compound to carry out neutralization and then an aqueous solution of a silicon compound is added to adjust the pH to a given value or colloidal silica is added, and (c) an aqueous solution of a tin compound is added to an aqueous alkali solution or an aqueous solution of a tin compound and an aqueous solution of an antimony compound are added to an aqueous alkali solution to carry out neutralization and then an aqueous solution of a silicon compound is added to adjust the pH to a given value or colloidal silica is added. Of these processes, the process (a) is industrially preferred, and, in this case, the pH of the neutralization reaction solution is kept at 3 or more, preferably 5–10.

The precursors are preferably those which are prepared by parallel addition of a stannic chloride solution or a stannic chloride solution and an antimony chloride solution with a sodium silicate solution. The antimony component in the precursors is preferably hydrous antimony oxide obtained by treating an antimony chloride solution with an alkali in the system of producing hydrous tin oxide by neutralizing or hydrolyzing a tin chloride solution.

The system of producing the hydrous tin oxide in the present invention means the step of producing the hydrous tin oxide by neutralizing or hydrolyzing the aqueous solution of a tin compound in the above processes (a)–(c), but it further includes the cases of producing a co-precipitate of hydrates of tin oxide and silicon oxide by neutralizing the solutions of a tin compound and a silicon compound and of producing a co-precipitate of hydrates of tin oxide, antimony oxide and silicon oxide by neutralizing the solutions of a tin compound, an antimony compound and a silicon compound.

The thus obtained precursor is subjected to ordinary washing, drying, pulverizing, etc. and fired at 700°–1200° C. in the presence of an alkali metal halide.

When the precursor and the alkali metal halide are mixed, this can be carried out by various methods. For example, the precursor treated as mentioned above and an alkali metal halide can be mixed by a mixing stirrer such as Henschel mixer, and when the resulting mixture is pulverized by a dry-type pulverizer, more preferred product in acicularity can be obtained. At this time, various adjustors can be added for adjusting the properties of the final product. For example, in order to adjust the acicularity of the acicular fine particles, phosphoric acid compounds such as potassium phosphate can be added.

The firing can be carried out at 700°–1200° C., preferably 800°–1100° C. If the firing temperature is lower than 700° C., the acicularity is insufficient and if it exceeds 1200° C., the diameter of the particles becomes longer and the transparency is apt to be damaged. The firing time is suitably 30 minutes to 5 hours.

Various alkali metal halides can be used, and examples are sodium chloride, potassium chloride, and lithium chloride. These may be used each alone or in admixture. The amount of the alkali metal halide is 1% or more, preferably 10–100% based on the total weight of $SnO_2$ and $SiO_2$ or $SnO_2$, $Sb_2O_3$ and $SiO_2$ of the precursor. If the amount is smaller than the above range, the acicularity is insufficient, and if it is too large, this is economically disadvantageous and, further, the productivity is inferior. When halides of alkaline earth metals such as $BaCl_2$ are used in place of the alkali metal halides, the particles can be made acicular to some extent, but this is not sufficient as compared with using of the alkali metal halides.

Then, the fired product is treated with water or an aqueous acid medium to remove soluble salts. As the acid, various acids can be used, such as inorganic acids or organic acids, and preferred are inorganic acids such as hydrochloric acid, sulfuric acid and hydrofluoric acid.

The product treated to remove soluble salts is, if necessary, subjected to centrifugal settling treatment or various classifying means to remove the particles of insufficient acicularity and then subjected to usual filtration, washing, drying, finishing pulverization, etc. to obtain an acicular electroconductive tin oxide fine particles or an acicular electroconductive tin oxide fine particles containing antimony which have a mean diameter of 0.005–1 μm and a mean length of 0.05–10 μm and an aspect ratio of 3 or higher, and preferably a mean diameter of 0.005–0.05 μm and a mean length of 0.1–3 μm and an aspect ratio of 5 or higher, more preferably at least 70% of the total weight of the powder having a mean diameter of 0.003–1 μm and a mean length of 0.05–5 μm and an aspect ratio of 5 or higher.

The acicular tin oxide particles as the substrate can be obtained by the above-mentioned process of the present invention, and deposition of hydrous antimony oxide on the acicular tin oxide can be carried out, for example, by dispersing the acicular tin oxide in a solvent such as water or an alcohol to prepare a suspension and adding thereto an aqueous or alcoholic solution of an antimony compound with stirring to carry out neutralization. The substrate particles desirably have a mean diameter of 0.005–1 μm, preferably 0.005–0.2 μm, a mean length of 0.05–10 μm, preferably 0.1–3 μm, and an aspect ratio of 3 or higher, preferably 5 or higher.

As examples of the tin compounds used as the tin component in the present invention, mention may be made of tin halides such as tin chloride, tin oxide, tin hydroxide, inorganic acid salts of tin such as tin sulfate and tin nitrate (stannous salts and stannic salts), etc. These compounds may be used each alone or in admixture of two or more. Use of an aqueous hydrochloric acid solution of tin chloride is industrially preferred.

As the silicon compounds used as the silicon components, there may be used various silane coupling agents, silicone oils, colloidal silica, etc. in addition to sodium silicate.

The amount of the silicon compound mixed with the tin compound is preferably 0.3–20%, more preferably 0.5–15% (in terms of $SiO_2$) based on the weight of $SnO_2$. If the amount is less than 0.3%, the acicularity cannot be obtained and even when it is added in an amount of more than 20%, the effect of addition does not increase and is economically not advantageous. Furthermore, the silicon compound is preferably added in a large amount to some extent in order to obtain a good acicularity, and, especially, when the antimony compound is added in a large amount within the above-mentioned rang for obtaining higher conductivity, it is preferred to add the silicon compound also in the larger amount within the above-mentioned range. However, if a large amount of the silicon compound remains in the final product, the electroconductivity is adversely affected, and, therefore, it is preferred to remove the unnecessary amount of the silicon compound by the treatment for removing soluble salts by immersing in hydrofluoric acid, etc. When the silicon compound remains in an amount of 0.1–10%, preferably 0.3–6% (in terms of $SiO_2$) based on the weight of $SnO_2$ in the product after subjected to the treatment for removal of soluble salts, the electroconductivity of the product is excellent, and the dispersibility of the product in water is excellent, and aqueous dispersions suitable for various uses can easily be obtained.

As the alkali of the aqueous alkali solution, mention may be made of, for example, hydroxides and carbonates of alkali metals such as sodium hydroxide, potassium hydroxide, sodium carbonate and potassium carbonate, and ammonia. These compounds may be used each alone or in admixture of two or more. The neutralization reaction can be carried out in water, hot water or an alcohol, and preferably carried out in hot water.

As the antimony compound as the antimony component, mention may be made of, for example, antimony halides such as antimony chloride, antimony oxide, antimony hydroxide, and inorganic acid salts such as antimony sulfate. These compounds may be used each alone or in admixture of two or more. An aqueous hydrochloric acid solution of antimony chloride is industrially preferred.

As for the mixing ratio of the tin compound and the antimony compound, the amount of the antimony component in the starting material is 0.1–8%, preferably 0.3–5% (in terms of $Sb_2O_3$) based on the weight of $SnO_2$. It is desired that the resulting product contains antimony in an amount of 0.1/100–8/100, preferably 0.3/100–5/100 as Sb/Sn. If Sb/Sn<0.1/100, the desired conductivity cannot be obtained, and if Sb/Sn>8/100, the desired acicular fine particles having a small diameter and a high aspect ratio suitable for obtaining sufficient transparency cannot be obtained.

Furthermore, when hydrous antimony oxide is deposited on the surface of acicular tin oxide particles as the substrate, the deposited amount is 0.1–20%, preferably 1–15% (in terms of $Sb_2O_3$) based on the weight of $SnO_2$. It is desired that the resulting product contains antimony in an amount of 0.1/100–20/100, preferably 1/100–15/100 in atomic ratio of Sb/Sn. If Sb/Sn<0.1/100, the desired conductivity cannot be obtained, and if Sb/Sn>20/100, the acicular fine powder having a sufficient conductivity cannot be obtained.

Deposition of the hydrous antimony oxide on the acicular tin oxide fine particles by neutralizing a solution of the antimony compound can be carried out by various processes, such as the following ones: 1) an aqueous solution of an antimony compound and an aqueous alkali solution are added in parallel to a tin oxide dispersed slurry to carry out neutralization, 2) an aqueous solution of an antimony compound is added to a tin oxide dispersed slurry and then an aqueous alkali solution is added to carry out neutralization, and 3) an aqueous solution of an antimony compound is added to a tin oxide dispersed slurry, followed by heating to boiling point to carry out hydrolysis. In the above processes 1)–2), addition to the tin oxide dispersed slurry may be carried out at room temperature, but when it is carried out under heating, for example, at 70°–90° C., hydrous antimony oxide can be deposited more uniformly and this is preferred.

As the alkali of the aqueous alkali solution used for neutralization of the solution of antimony compound, mention may be made of, for example, hydroxides and carbonates of alkali metals such as sodium hydroxide, potassium hydroxide, sodium carbonate and potassium carbonate, and ammonia. These compounds may be used each alone or in admixture of two or more.

Next, the resulting product having hydrous antimony oxide deposited thereon is filtrated, washed and recovered, and by sufficiently washing and removing the alkali metal component used as the neutralizing agent, electroconductivity can be more effectively developed by the action of the antimony component in the firing step referred to hereinafter. The recovered product is, if necessary, subjected to drying and pulverization, and then fired. The firing can be carried out at 700°–1000° C. If the firing temperature is lower than 700° C., electroconductivity is insufficient and if it is higher than 1000° C., the diameter of the fine particles is large and the original shape cannot be maintained. The firing time is suitably 30 minutes to 5 hours.

The acicular electroconductive tin oxide fine particles or the acicular electroconductive tin oxide fine particles containing antimony according to the present invention are incorporated in plastics, rubbers, fibers, etc. as an electroconductivity-imparting agent or as a substrate to utilize them as electroconductive compositions such as electroconductive plastics, electroconductive paints, magnetic paints, electroconductive rubbers, and electroconductive fibers. In the case of electroconductive plastics, various plastics such as so-called general-purpose plastics and engineering plastics can be used. Examples of general-purpose plastics are a polyethylene, vinyl chloride resin, polystyrene, polypropylene, methacrylic resin, and urea.melamine resin. Examples of general-purpose plastics included in engineering plastics are a phenolic resin, unsaturated polyester resin, rigid vinyl chloride resin, ABS resin, and AS resin. Examples of engineering plastics are an epoxy resin, polyacetal, polycarbonate, polybutylene terephthalate, polyethylene terephthalate, polyphenylene ether, polyphenylene sulfide, polysulfone, and fluorocarbon resin. Examples of super-engineering plastics are a diallyl phthalate resin, silicone resin, polyimide resin, polyamideimide, bismaleimidetriazine, polyaminobismaleimide, olefin-vinyl alcohol copolymer, polyoxybenzylene, polymethylpentene, polyether sulfone, polyether imide, polyarylate, and polyether ketone. The amount of the acicular electroconductive tin oxide fine particles added to the above molding resins is 3–200 parts by weight, preferably 10–100 parts by weight for 100 parts by weight of the resin.

When the acicular electroconductive tin oxide fine particles or the acicular electroconductive tin oxide fine particles containing antimony according to the present invention is utilized as electroconductive paints or magnetic paints, it is incorporated in various binders, such as a polyvinyl alcohol resin, vinyl chloride-vinyl acetate resin, acrylic resin, epoxy resin, urethane resin, alkyd resin, polyester resin, ethylene-vinyl acetate copolymer, acryl-styrene copolymer, cellulosic resin, phenolic resin, amino resin, fluorocarbon resin, silicone resin and petroleum resin, and natural resins such as shellac, rosin derivative and rubber derivative, and the resulting mixture is dispersed in water or solvents. The amount of the acicular electroconductive tin oxide fine particles added to the binder resin is 3–200 parts by weight, preferably 10–100 parts by weight for 100 parts by weight of solid matter of the binder. In the case of electroconductive paints, the paint is coated on an insulating substrate such as a paper or polymer film to form an electroconductive coat which is light in weight and excellent in transparency, surface smoothness and adhesion, and, thus, various antistatic films, static recording papers, electrophotographic copying papers, etc. are obtained. When the acicular electroconductive tin oxide fine particles are applied to an aqueous paint, it is preferred to prepare an aqueous dispersion by dispersing the tin oxide fine particles or a cake obtained by removing soluble salts from the tin oxide fine particles in the production step of the tin oxide fine particles in an aqueous medium and to use the resulting aqueous dispersion as a paint for saving the dispersing energy needed in preparation of paint, and dehydration and drying energy needed at the step of producing the tin oxide fine particles. The solid concentration of the aqueous dispersion is 1–70% by weight, preferably 10–50% by weight, and the pH value of the aqueous dispersion is 4–12, preferably 5–10.

When the tin oxide fine particles are applied to the paints used for preparation of magnetic recording mediums, they are useful for improvement of adhesion between a non-magnetic support and a magnetic layer, prevention of static charging of the magnetic recording mediums, enhancement of a film strength, thinning of the magnetic layer, improvement of dispersibility of a lower non-magnetic layer for surface smoothening and improvement of surface smoothness. Especially, recently, there are marked tendencies for magnetic recording to increase a recording density and, further, to shorten a recording wavelength. For this purpose, it is more strongly demanded to the thin the magnetic layer of the magnetic recording media. However, when the magnetic layer is thinned, the influence of the support is apt to appear on the surface of the magnetic layer and electromagnetic conversion characteristics are unavoidably deteriorated. Therefore, a non-magnetic undercoat layer is provided on the surface of the non-magnetic support, and the magnetic layer is provided thereon as an upper layer, whereby the influence of the surface roughness of the support is dissolved and, further, the magnetic layer is thinned to increase an output. The proportion of the acicular electroconductive tin oxide fine particles of the present invention incorporated in the lower non-magnetic layer is about 20–80% by volume.

In the case of electroconductive rubbers, the tin oxide fine powder is incorporated in the conventionally known rubbers such as silicone rubber, isoprene rubber, styrene-butadiene rubber, butadiene rubber, butyl rubber, butadiene-acrylonitrile rubber, ethylene-propylene-diethane polymer, ethylene-propylene rubber, fluororubber, ethylene-vinyl acetate copolymer, chlorinated polyethylene, acrylic rubber, chloroprene rubber, urethane rubber, polysulfide rubber, chlorosulfonated polyethylene rubber, and epichlorohydrin rubber.

In the case of utilizing as electroconductive fibers, the tin oxide fine particles are incorporated in spinnable fibers of polyamide resin, polyester resin, polyolefin resin, polyvinyl resin, polyether resin, etc.

The thus obtained electroconductive compositions can give a high conductivity with addition in a smaller amount to the resin binder than the conventional electroconductive compositions comprising spherical electroconductive particles, and, furthermore, are superior in transparency and economically advantageous. Since the amount of the acicular tin oxide fine particles of the present invention can be smaller, the particles can be utilized without causing reduction in the strength of the binder. Furthermore, in the case of an electroconductive paint of high concentration, the desired conductivity can be obtained even with a thin coat. Especially, when the acicular tin oxide fine particles containing antimony obtained by depositing hydrous antimony oxide on the acicular tin oxide particles is used, the products are unexpectedly diminished in a bluish color tone with an excellent conductivity and transparency.

The present invention will be illustrated by the following examples.

EXAMPLE 1

A solution prepared by dissolving 500 g of stannic chloride pentahydrate in 500 ml of an aqueous 3N hydrochloric acid solution, 17.4 ml of an aqueous sodium silicate solution (308 g/l in terms of $SiO_2$) and sodium hydroxide were added in parallel to 5 l of pure water of 90° C. over a period of 20 minutes with keeping the pH of the system at 7–7.5 to produce a co-precipitate. Then, hydrochloric acid was added thereto to adjust the pH of the system to 3, and, thereafter, the precipitate was filtrated and washed with water until the specific resistance of the filtrate reached 15000 $\Omega$cm. The resulting cake was dried at 110° C. for 12 hours, and sodium chloride was added to the dried product in an amount of 20 parts by weight for 100 parts by weight of the dried product, followed by uniformly mixing them and pulverizing the mixture. This mixture was fired at 900° C. for 1 hour in an electric furnace. Thereafter, the resulting fired product was immersed in an aqueous hydrofluoric acid solution to remove soluble salts, followed by drying and pulverizing to obtain desired acicular electroconductive tin oxide fine particles.

EXAMPLE 2

Desired acicular electroconductive tin oxide fine particles were obtained in the same manner as in Example 1, except that 34.9 ml of aqueous sodium silicate solution was used.

EXAMPLE 3

Desired acicular electroconductive tin oxide fine particles were obtained in the same manner as in Example 1, except that potassium chloride was used in place of the sodium chloride.

EXAMPLE 4

Desired acicular electroconductive tin oxide fine particles were obtained in the same manner as in Example 1, except that the firing temperature was 1000° C. Electron photomicrograph of the product is shown in FIG. 1.

EXAMPLE 5

A solution prepared by dissolving 300 g of stannic chloride pentahydrate in 300 ml of an aqueous 3N hydrochloric acid solution and a sodium hydroxide solution having a concentration of 200 g/l were added in parallel to 5 l of pure water of 90° C. over a period of 20 minutes with keeping the pH of the system at 7.0–8.0 to produce a precipitate. Then, hydrochloric acid was added thereto to adjust the pH of the system to 3, and, thereafter, the precipitate was filtrated and washed with water until the specific resistance of the filtrate reached 20000 $\Omega$cm. The resulting cake was dried at 120° C. for 12 hours and pulverized by a pulverizer. To 100 parts by weight of the pulverized product were added 2.5 parts by weight of colloidal silica and 20 parts by weight of sodium chloride, followed by mixing to obtain a uniform mixture. This mixture was fired at 900° C. for 1 hour in an electric furnace. Thereafter, the resulting fired product was immersed in an aqueous hydrofluoric acid solution to remove soluble salts, followed by drying and pulverizing to obtain desired acicular electroconductive tin oxide fine particles.

EXAMPLE 6

Desired acicular electroconductive tin oxide fine particles were obtained in the same manner as in Example 1, except that the amount of the sodium chloride was 60 parts by weight.

COMPARATIVE EXAMPLE 1

Electroconductive fine particles were obtained in the same manner as in Example 1, except that sodium chloride was not used.

COMPARATIVE EXAMPLE 2

Figure 2:
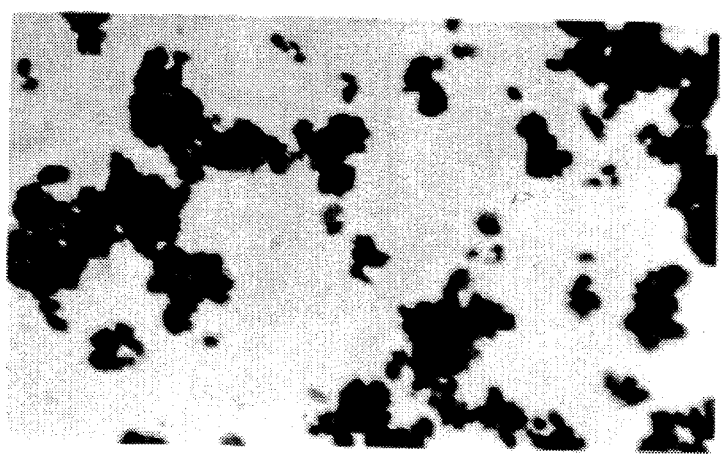
FIG. 2 is an electron photomicrograph (×100,000) which shows the particle shape of the electroconductive fine particles obtained in Comparative Example 2.

Electroconductive fine particles were obtained in the same manner as in Example 1, except that sodium silicate was not used. An electron photomicrograph of the product is shown in FIG. 2.

COMPARATIVE EXAMPLE 3

Electroconductive fine particles were obtained in the same manner as in Example 1, except that the firing temperature was 600° C.

EXAMPLE 7

A solution prepared by dissolving 500 g of stannic chloride pentahydrate and 3.36 g of antimony trichloride in 500 ml of an aqueous 3N hydrochloric acid solution, 17.4 ml of an aqueous sodium silicate solution (308 g/l in terms of $SiO_2$) and sodium hydroxide were added in parallel to 5 l of pure water of 90° C. over a period of 20 minutes with keeping the pH of the system at 7–7.5 to produce a co-precipitate. Then, hydrochloric acid was added thereto to adjust the pH of the system to 3, and, thereafter, the precipitate was filtrated and washed with water until the specific resistance of the filtrate reached 15000 Ωcm. The resulting cake was dried at 110° C. for 12 hours and sodium chloride in an amount of 20 parts by weight was added to 100 parts by weight of the dried product, followed by uniformly mixing them and pulverizing the mixture. This mixture was fired at 900° C. for 1 hour in an electric furnace. Thereafter, the resulting fired product was immersed in an aqueous hydrofluoric acid solution to remove soluble salts, followed by drying and pulverizing to obtain desired acicular electroconductive tin oxide fine particles containing antimony. The value b* of the color of the particles (compacted under a pressure of 200 $kg/cm^2$) was −9.4 and the value L* thereof was 73.6.

EXAMPLE 8

Desired acicular electroconductive tin oxide fine particles containing antimony were obtained in the same manner as in Example 7, except that the amount of the antimony trichloride was 10.1 g.

EXAMPLE 9

Desired acicular electroconductive tin oxide fine particles containing antimony was obtained in the same manner as in Example 7, except that 34.9 ml of the aqueous sodium silicate solution was used.

EXAMPLE 10

Desired acicular electroconductive tin oxide fine particles containing antimony were obtained in the same manner as in Example 7, except that potassium chloride was used in place of the sodium chloride.

EXAMPLE 11

Figure 3:
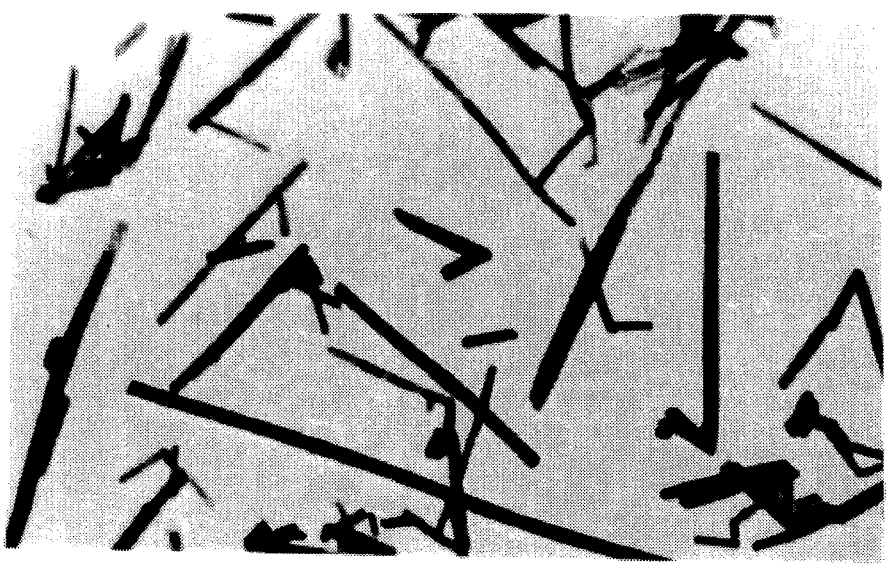
FIG. 3 is an electron photomicrograph (×100,000) which shows the particle shape of the acicular electroconductive tin oxide fine particles of the present invention which contain antimony and were obtained in Example 11.

Desired acicular electroconductive tin oxide fine particles containing antimony were obtained in the same manner as in Example 7, except that the firing temperature was 1000° C. An electron photomicrograph of the product is shown in FIG. 3.

EXAMPLE 12

A solution prepared by dissolving 300 g of stannic chloride pentahydrate and 2.02 g of antimony trichloride in 300 ml of an aqueous 3N hydrochloric acid solution and a sodium hydroxide solution having a concentration of 200 g/l were added in parallel to 5 l of pure water at 90° C. over a period of 20 minutes with keeping the pH of the system at 7.0–8.0 to produce a co-precipitate. Then, hydrochloric acid was added thereto to adjust the pH of the system to 3, and, thereafter, the precipitate was filtrated and washed with water until the specific resistance of the filtrate reached 20000 Ωcm. The resulting cake was dried at 120° C. for 12 hours and, then, pulverized with a pulverizer. To 100 parts by weight of the pulverized product were added 2.5 parts by weight of colloidal silica and 20 parts by weight of sodium chloride, followed by uniformly mixing them. This mixture was fired at 900° C. for 1 hour in an electric furnace. Thereafter, the resulting fired product was immersed in an aqueous hydrofluoric acid solution to remove soluble salts, followed by drying and pulverization to obtain desired acicular electroconductive tin oxide fine particles containing antimony.

EXAMPLE 13

Desired acicular electroconductive tin oxide fine particles containing antimony were obtained in the same manner as in Example 7, except that the amount of the sodium chloride was 60 parts by weight.

COMPARATIVE EXAMPLE 4

Electroconductive fine particles were obtained in the same manner as in Example 7, except that sodium chloride was not used.

COMPARATIVE EXAMPLE 5

Figure 4:
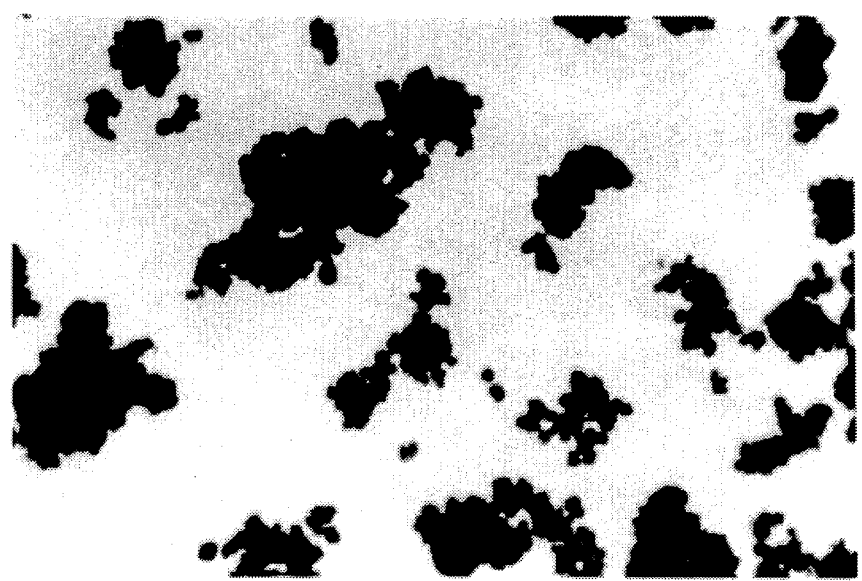
FIG. 4 is an electron photomicrograph (×100,000) which shows the particle shape of the electroconductive fine particles obtained in Comparative Example 5.

Electroconductive fine particles were obtained in the same manner as in Example 7, except that sodium silicate was not used. An electron photomicrograph of the product is shown in Fig. 4

COMPARATIVE EXAMPLE 6

Electroconductive fine particles were obtained in the same manner as in Example 7, except that 37 g of antimony trichloride was used.

COMPARATIVE EXAMPLE 7

Electroconductive fine particles were obtained in the same manner as in Example 7, except that the firing temperature was 600° C.

COMPARATIVE EXAMPLE 8

A solution prepared by dissolving 234.5 g of stannic chloride pentahydrate and 15.6 g of antimony trichloride in 500 ml of an aqueous 5N hydrochloric acid solution and 9.7 ml of an aqueous sodium silicate solution (308 g/l in terms of $SiO_2$) were added in parallel to 5 l of water at 90° C. over a period of 30 minutes with keeping the pH of the system at 6–7 to produce a co-precipitate of tin oxide, antimony oxide and silicon oxide hydrates. Then, hydrochloric acid was added thereto to adjust the pH of the system to 3, and, thereafter, the precipitate was filtrated and washed with water until the specific resistance of the filtrate reached 10000 Ωcm. The resulting cake was fired at 700° C. for 4 hours and the fired product was pulverized with a pulverizer to obtain spherical fine particles having a specific surface area of 75.6 $m^2$/ g.

EXAMPLE 14

A solution prepared by dissolving 500 g of stannic chloride pentahydrate in 500 ml of an aqueous 3N hydrochloric acid solution, 17.4 ml of an aqueous sodium silicate solution (308 g/l in terms of $SiO_2$) and a sodium hydroxide solution were added in parallel to 5 l of pure water at 90° C. over a period of 20 minutes with keeping the pH of the system at 7–7.5 to produce a co-precipitate. Then, hydrochloric acid was added thereto to adjust the pH of the system to 3, and, thereafter, the co-precipitate was filtrated and washed with water until the specific resistance of the filtrate reached 20000 Ωcm. The resulting cake was dried at 110° C. for 12 hours and, then, to 100 parts by weight of the dry product was added 20 parts by weight of sodium chloride, followed by uniformly mixing and pulverizing them. This mixture was fired at 900° C. for 1 hour in an electric furnace. Thereafter, the resulting fired product was immersed in an aqueous hydrofluoric acid solution to remove soluble salts. The resulting cake was repulped in 5 l of pure water and heated to 90° C. Then, thereto were added in parallel a solution prepared by dissolving 3.36 g of antimony trichloride (1/100 in the atomic ratio of Sb/Sn) in 300 ml of an aqueous 3N hydrochloric acid solution and a sodium hydroxide solution over a period of 20 minutes with keeping the pH of the system at 7–7.5 to deposit hydrous antimony oxide on the acicular tin oxide. Then, hydrochloric acid was added to adjust the pH of the system to 3, and, thereafter, the precipitate was filtrated and washed with water until the specific resistance of the filtrate reached 20000 Ωcm. The resulting cake was fired at 900° C. for 1 hour in an electric furnace and pulverized with a pulverizer to obtain the acicular electroconductive tin oxide fine particles of the present invention containing antimony.

EXAMPLE 15

The acicular electroconductive tin oxide particles of the present invention containing antimony were obtained in the same manner as in Example 14, except that the firing temperature of fractionated and recovered cake after deposition of hydrous antimony oxide was 1000° C.

EXAMPLE 16

The acicular electroconductive tin oxide particles of the present invention containing antimony were obtained in the same manner as in Example 14, except that the amount of the antimony trichloride was 16.82 g (5/100 in the Sb/Sn atomic ratio).

TEST EXAMPLE 1

The following measurements were conducted on the samples of the electroconductive fine particles obtained in the above Examples and Comparative Examples. (1) The weight mean particle size was obtained by observing an electron photomicrograph (×100,000) and, furthermore, the aspect ratio was calculated therefrom. (2) The specific resistance (Ωcm) of the sample powder under a pressure of 100 kg/$cm^2$ was measured by digital multimeter: Model 2502A manufactured by Yokogawa Hokushin Electric Co., Ltd. The results are shown in Table 1.

TABLE 1

| | Shape and size of particles (μm) | | | |
|---|---|---|---|---|
| | Mean diameter | Mean length | Aspect ratio | Powder resistance |
| Example 1 | 0.010 | 0.20 | 20 | 9.2 kΩcm |
| Example 2 | 0.012 | 0.23 | 19 | 5.3 kΩcm |
| Example 3 | 0.010 | 0.25 | 25 | 7.6 kΩcm |
| Example 4 | 0.015 | 0.48 | 32 | 2.1 kΩcm |
| Example 5 | 0.013 | 0.07 | 5 | 9.3 kΩcm |
| Example 6 | 0.011 | 0.15 | 11 | 5.1 kΩcm |
| Comparative Example 1 | Not acicular | | | 12.1 kΩcm |
| Comparative Example 2 | " | | | 10.9 kΩcm |
| Comparative Example 3 | " | | | 51.2 kΩcm |
| Example 7 | 0.011 | 0.50 | 45 | 4.6 Ωcm |
| Example 8 | 0.013 | 0.23 | 18 | 2.0 Ωcm |
| Example 9 | 0.015 | 0.57 | 38 | 4.5 Ωcm |
| Example 10 | 0.011 | 0.30 | 27 | 4.7 Ωcm |
| Example 11 | 0.020 | 1.20 | 60 | 2.6 Ωcm |
| Example 12 | 0.015 | 0.17 | 11 | 4.9 Ωcm |
| Example 13 | 0.012 | 0.38 | 32 | 6.0 Ωcm |
| Comparative Example 4 | Not acicular | | | 3.6 Ωcm |
| Comparative Example 5 | " | | | 2.0 Ωcm |
| Comparative Example 6 | " | | | 1.8 Ωcm |
| Comparative Example 7 | " | | | 100 Ωcm |
| Comparative Example 8 | " | | | 2.1 Ωcm |
| Example 14 | 0.015 | 0.50 | 33 | 18.5 Ωcm |
| Example 15 | 0.024 | 0.52 | 22 | 31.7 Ωcm |
| Example 16 | 0.014 | 0.50 | 36 | 8.0 Ωcm |

TEST EXAMPLE 2

Each of the electroconductive fine particles (20 g each) obtained in Examples 1 and 7 and Comparative Examples 2, 5 and 8 was mixed with 30.6 g of an acrylic resin (ACRYDICK A-165-45 of 45% by weight in a solid content manufactured by Dainippon Ink & Chemicals Inc.), 26.4 g of a toluene-butanol mixed solution (1:1 in mixing weight ratio) and 50 g of glass beads. Then, the resulting mixture was shaken for 20 minutes with a paint shaker (#5110 manufactured by Red Devil Co., Ltd.) to prepare a mill base.

Then, to each of the mill bases were added the above acrylic resin and toluene-butanol mixed solution in a given amount, respectively, followed by stirring and mixing to prepare a paint having a pigment concentration (wt %) as shown in Table 2. This paint was coated on a polyester film at a dry film thickness of 4 μm and air-dried for 40 hours to make a test sheet. The surface resistivity (Ω/□) of the sheet was measured by a digital ohmmeter: R-506 manufactured by Kawaguchi Denki Mfg. Co., Ltd.

Furthermore, haze (%) was measured with a haze meter: NDH-300A manufactured by Nippon Denshoku Kogyo Co., Ltd.

The results are shown in Tables 2 and 3.

TABLE 2

| Electroconductive material | Surface resistivity ($\Omega/\square$) Pigment concentration | | |
|---|---|---|---|
| | 30 wt % | 40 wt % | 50 wt % |
| Example 1 | $1.5 \times 10^{11}$ | $1.9 \times 10^{11}$ | $1.3 \times 10^{11}$ |
| Comparative Example 2 | Higher than $10^{14}$ | $1.5 \times 10^{13}$ | $6.6 \times 10^{11}$ |

| Electroconductive material | Surface resistivity ($\Omega/\square$) Pigment concentration | | |
|---|---|---|---|
| | 15 wt % | 20 wt % | 25 wt % |
| Example 7 | $1.7 \times 10^{10}$ | $2.3 \times 10^{9}$ | $1.5 \times 10^{9}$ |
| Comparative Example 5 | Higher than $10^{14}$ | Higher than $10^{14}$ | Higher than $10^{14}$ |
| Comparative Example 8 | Higher than $10^{14}$ | Higher than $10^{14}$ | Higher than $10^{14}$ |

TABLE 3

| Electroconductive material | Haze (%) Pigment concentration | | |
|---|---|---|---|
| | 30 wt % | 40 wt % | 50 wt % |
| Example 1 | 47 | 61 | 74 |
| Comparative Example 2 | 46 | 57 | 70 |

| Electroconductive material | Haze (%) Pigment concentration | | |
|---|---|---|---|
| | 15 wt % | 20 wt % | 25 wt % |
| Example 7 | 25.2 | 32.2 | 39.4 |
| Comparative Example 5 | 23.5 | 31.2 | 37.3 |
| Comparative Example 8 | 21.4 | 29.5 | 35.6 |

TEST EXAMPLE 3

Each of the samples of the electroconductive fine particles obtained in Examples 14, 15 and 16 was shaped under a pressure of 200 kg/cm² into a columnar compacted powder (33 mm in diameter and 5 mm in thickness), and the color of the powder was measured with a color computer SM-7-IS-2B manufactured by Suga Tester Mfg. Co., Ltd. The results are shown in Table 4. The value L* and value b* of the powder color show index of lightness and index of chromaticness of CIE 1976 L*a*b* color space in Commission Internationale de I' Eclairage.

TABLE 4

| | Color of powder | |
|---|---|---|
| | b* | L* |
| " 14 | −5.8 | 82.3 |
| " 15 | −4.6 | 85.9 |
| " 16 | −6.0 | 81.0 |

The present invention provides acicular electroconductive fine particles or an acicular electroconductive fine particles containing antimony which can give the same conductivity with addition in a smaller amount as conventional electroconductive fine particles and a process for producing the fine particles without using special apparatuses and expensive starting materials. Furthermore, the acicular electroconductive fine particles of the present invention which contains antimony are markedly lower in powder resistance than potassium titanate fibers coated with a conductive layer comprising tin oxide and antimony oxide. In addition, resin compositions or binders containing the fine particles of the present invention have a very excellent conductivity and excellent transparency. Especially, the finer particles of 0.005–0.05 µm in diameter are excellent in transparency. Moreover, the acicular electroconductive fine particles containing antimony which are obtained by depositing hydrous antimony oxide on the acicular tin oxide particles has little bluish tone and a high lightness and excellent transparency and conductivity.

What is claimed is:

1. A process for producing acicular electroconductive tin oxide fine particles having a mean diameter of 0.005–1 µm and a mean length of 0.05–10 µm and an aspect ratio of 3 or higher which comprises firing a starting material containing tin, silicon and an alkali metal halide at 700°–1200° C. and removing soluble salts from the resulting fired product.

2. A process according to claim 1, wherein the content of silicon in terms of $SiO_2$ in the starting material is 0.3–20% based on the weight of $SnO_2$.

3. A process according to claim 1, wherein removal of the soluble salts is carried out by treating the fired product with a medium of an inorganic acid.

4. A process according to claim 1, wherein the starting material contains tin, silicon, an alkali metal halide and additionally antimony or an antimony compound.

5. A process according to claim 4, wherein the content of antimony in terms of $Sb_2O_3$ in the starting material is 0.1–8% based on the weight of $SnO_2$.

6. A process according to claim 4, wherein the content of silicon in terms of $SiO_2$ in the starting material is 0.3–20% based on the weight of $SnO_2$.

7. A process according to claim 4, wherein removal of the soluble salts is carried out by treating the fired product with a medium of an inorganic acid.

8. A process for producing acicular electroconductive tin oxide fine particles containing antimony, which comprises adding a solution of an antimony compound to a suspension of the acicular electroconductive tin oxide fine particles of claim 1, then carrying out neutralization to deposit a hydrous antimony oxide on the surface of the tin oxide fine particles, and, thereafter, firing the filtrated and recovered product at 700°–1000° C.

9. A process according to claim 8, wherein the amount of the deposited antimony in terms of $Sb_2O_3$ is 0.1–20% based on the weight of $SnO_2$.

* * * * *